United States Patent [19]

Lederer

[11] Patent Number: 4,689,486

[45] Date of Patent: Aug. 25, 1987

[54] FOLDED OPTICAL SYSTEM FOR RADIATION DETECTION DEVICE

[75] Inventor: David B. Lederer, Rochester, N.Y.

[73] Assignee: Detection Systems, Inc., Fairport, N.Y.

[21] Appl. No.: 802,683

[22] Filed: Nov. 29, 1985

[51] Int. Cl.[4] .................... G01J 1/00

[52] U.S. Cl. .................... 250/338; 250/342

[58] Field of Search .................... 250/338 R, 342; 350/1.1, 1.6, 625, 627

[56] References Cited

U.S. PATENT DOCUMENTS

| | | | |
|---|---|---|---|
| 4,258,255 | 3/1981 | Guscott | 250/342 |
| 4,271,360 | 6/1981 | Ward | 250/338 |
| 4,551,711 | 11/1985 | Akiyama et al. | 250/342 |

*Primary Examiner*—Janice A. Howell
*Attorney, Agent, or Firm*—Warren W. Kurz

[57] ABSTRACT

A folded modular optical system adapted for use, for example, in a passive infrared intruder detection device for directing radiation from a plurality of discrete fields of view onto a radiation-sensitive detector comprises an elongated rectangularly-shaped spherical reflector and a multifaceted reflective element. The latter comprises a plurality of elongated, generally parallel, planar reflectors which serve to direct radiation onto different portions of the spherical reflector. To minimize the effects of spherical aberration, the planar reflectors are arranged so that the portions of the spherical reflector which they irradiate are substantially perpendicular to the longer dimension of the rectangularly-shaped spherical reflector. Preferably, each of the planar reflectors is canted relative to the others so that its field of view is substantially co-planar with those of the other planar reflectors. It is also preferred that the planar reflectors vary in size and, hence, light-gathering power as a function of the intended range of protection they provide.

6 Claims, 7 Drawing Figures

FOLDED OPTICAL SYSTEM FOR RADIATION DETECTION DEVICE

BACKGROUND OF THE INVENTION

This invention relates to improvements in folded optical systems, such as the modular optical systems used in today's intruder detection devices of the optical or passive infrared variety.

Folded modular optical systems are known in the intruder detecting art for focusing infrared (IR) energy, emanating from a would-be intruder in any one of a plurality of different fields of view, onto an IR-sensitive detector. In one such optical system, shown in FIGS. 1 and 2, and presently used in assignee's passive IR device known as the Model DS 964 PIR Detector, a somewhat elongated rectangularly shaped spherical reflector 10, arranged with its optical axis in a vertical plane, cooperates with a unitary, multifaceted optical element 12 to provide a plurality of fields of view V1–V4, one above the other in a substantially vertical plane. As shown, the multifaceted element comprises a plurality of elongated planar reflectors 14, each being arranged at a different tilt angle relative to the horizontal plane. Radiation emanating from the different fields of view strikes the planar reflectors and is redirected thereby toward the spherical element which, in turn, focuses such radiation on the detector D.

In the folded optical system briefly described above, the rectangularly shaped spherical reflector is arranged so that its longer dimension L is parallel to the longer dimension 1 of the planar reflectors. While this arrangement affords a compact detector housing (viewed from front to back), it limits the degree to which radiation can be sharply focused onto the IR detector. Since each planar reflector directs rediation across the entire length of the reflector, the effects of spherical aberration are accentuated. While the effects of such aberrations are not great, they do diminish the sensitivity of the system and should be avoided to the extent economics allow. An obvious solution would be to replace the spherical reflector with one of parabolic shape. This approach, however, adds significant cost to the system and is undesirable if only from that standpoint.

Another disadvantage of the prior art system noted above is that each of the planar reflectors is substantially the same size as the others and, hence, each has the same light-gathering power. This leads to system sensitivity variations as a function of distance over which each field of view is intended to provide coverage. While this uniformity of light-gathering power presents no problem with the near fields of view, where the same target can produce a saturated output regardless of which near field it appears, it does lead to sensitivity fall-off in the far fields.

SUMMARY OF THE INVENTION

According to the invention, the effects of spherical aberrations in folded spherical optical systems of the type described are minimized by reorienting the planar reflectors so that the long dimension of each extends in a direction substantially perpendicular to the long dimension of the spherical reflector, rather than parallel to it. By this arrangement, each planar reflector subtends a smaller arc over the surface of the spherical element. To assure that each field of view lies in substantially the same plane as the others, the planar reflectors are appropriately canted relative to the optical axis of the spherical reflector. Further, according to a preferred embodiment, at least some of the planar elements are sized so that their respective area (i.e. light-gathering capability) is proportional to their tilt-angle and, hence, the distance over which they are intended to provide coverage.

The invention and its various advantages will become more apparent to those skilled in the art from the ensuing detailed description of preferred embodiments, reference being made to the accompanying drawings.

DETAILED DESCRIPTION OF PREFERRED EMBODIMENTS

Figure 3:
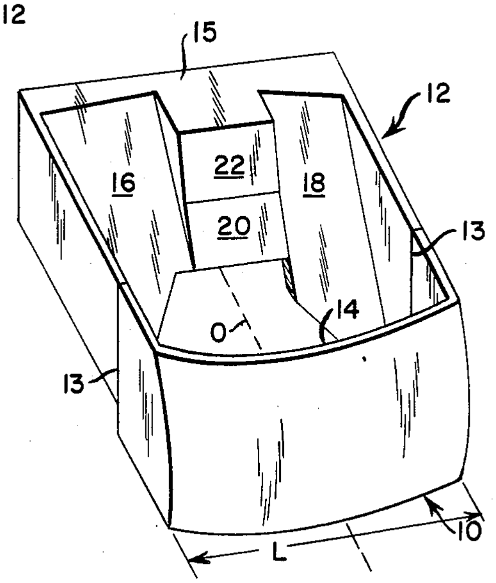
FIG. 3 is a perspective view of a preferred embodiment of the invention.

Referring now to the drawings, FIG. 3 is a perspective view of a folded modular optical system S embodying the invention. Such system basically comprises independent optical modules 10, 12 which are fitted together along a common boundary 13. Module 10 comprises a spherical reflector 14 having an optical axis O which, in the normal orientation of the system, extends vertically. As better shown in the views of FIGS. 4 and 5, spherical reflector 14 has an elongated rectangular shape, its length L being somewhat longer than its width W. Module 12 takes the form of a multifaceted reflective element comprising a plurality of planar reflectors 16, 18, 20 and 22. Both modules can be produced economically by conventional molding and metal plating techniques.

Figure 4:
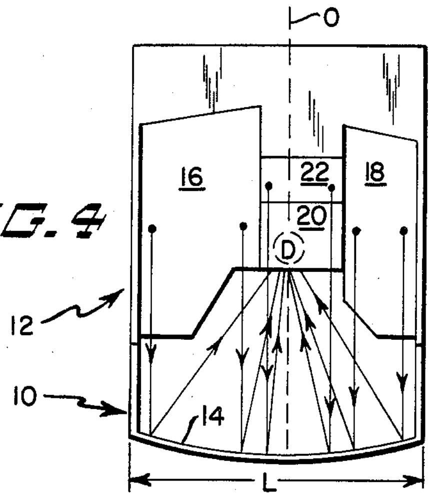
FIGS. 4 and 5 are front and side views, respectively, of the embodiment shown in FIG. 3.
Figure 5:
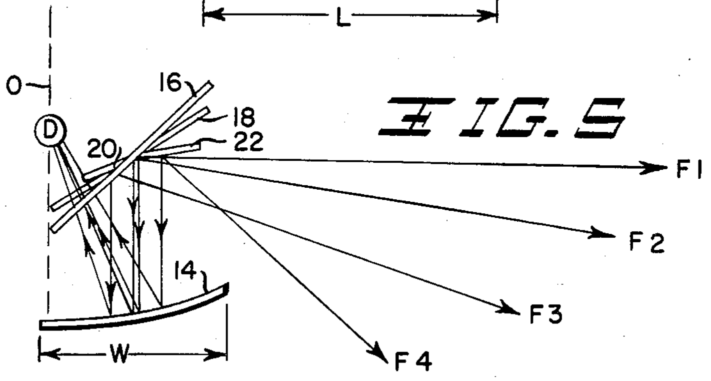

Referring to FIGS. 4 and 5, each of the planar reflectors of the multifaceted element is oriented at a different tilt angle relative to the horizontal. Radiation emanating in different fields of view F1–F4 strikes the planar reflectors an is reflected thereby to the surface of the spherical element 14. The latter, having a relatively short focal length of about 1.3 inch, operates to focus the incident radiation onto a detector D located at the focal point of the spherical element along its optical axis O.

Figure 1:
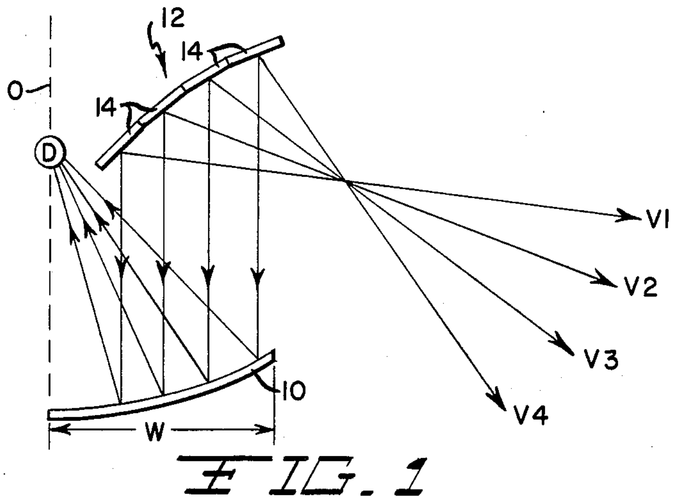
FIG. 1 (PRIOR ART)
FIGS. 1 and 2 are side and front illustrations, respectively, of a prior art optical system.
Figure 2:
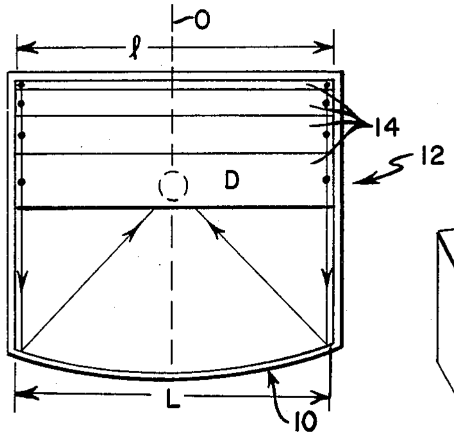
FIG. 2 (PRIOR ART)

In contrast with prior art systems of the type shown in FIGS. 1 and 2, planar reflectors 16, 18, 20 and 22 are arranged and sized so that each irradiates a relatively small angular range on the spherical reflector's surface. As shown in FIG. 4, each of the planar reflectors 16 and 18 has an elongated rectangular shape, and each is arranged so that its longer dimension extends in a direction substantially perpendicular to the longer dimension L of the spherical reflector 10. Alsoto be noted in FIG. 4 is that all of the planar reflectors 16, 18, 20 and 22 have a dimension, measured in a direction parallel to the spherical reflector's length L, which is substantially shorter than length L. This has the desirable effect of reducing spherical aberrations. As shown in FIG. 4, parallel rays of radiation striking planar reflector 16, for example, is redirected to the spherical reflector and subtends a relatively small arc across the length of such surface. While plnar reflectors 16 and 18 reflect radiation over substantially the entire width of the spherical, the aberrations are nonetheless significantly reduced compared to the prior art system since the the width is only a fraction of its length.

In optical systems of the type described, it is often desirable that the different fields of view F1–F4 be in the same vertical plane. In the prior art system of FIGS. 1 and 2 where the planar reflectors are coextensive in the horizontal plane, the different fields of view are inherently alligned vertically. However, in the instant system where most of the planar reflectors are arranged side-by-side in the horizontal plane, the different fields tend to diverge in a horizontal plane. This divergence is primarily due to the effects of spherical aberrations which cause the off-axis rays to be focused at a point inside the focal point for paraxial rays. To bring the different fields of view into alignment, one above the other in a vertical plane, the off-axis planar reflectors (i.e., elements 16 and 18) are appropriately canted relative to the system's optical axis. Such canting is best shown in FIGS. 3 and 4.

Figure 6A:
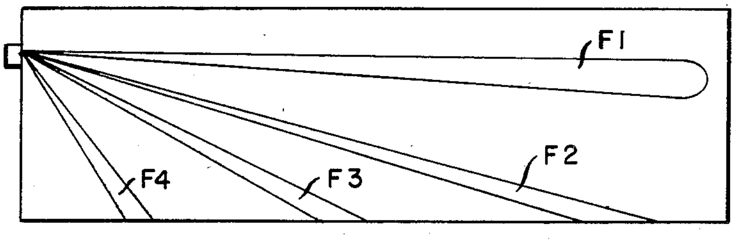
FIGS. 6A and 6B are side and top views, respectively, of the coverage provided by the optical system shown in FIGS. 3–5.
Figure 6B:
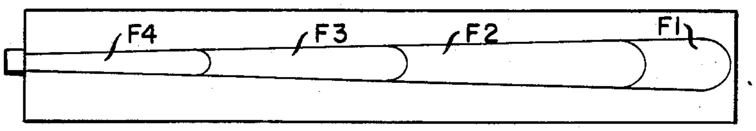

The optical system of the invention is useful, for example, in passive infrared intruder detection devices. Such devices are often located in an elevated position, e.g., on the end wall of a corridor. The protection provided by such devices is defined by the different fields of view of its optical system. When mounted in such an elevated position, the optical system of the invention will provide coverage similar to that depicted by the fields of view shown in FIGS. 6A and 6B. In FIG. 6A it is apparent that the range over which protection need be provided in fields of view F3 and F4 is foreshortened by the floor of the space under surveillance. Thus, the light gathering power of the optical elements that define the "near fields" F3 and F4 need not be as great as that of the optical elements that define "far fields". To maintain the device sensitivity about constant in each field, and to make the most efficient use of the system's light-gathering power, it is desirable to size the planar reflectors in accordance with the range over which it provides protection. With this concept in mind, the area of reflector 16 is made larger than the others, since its field of view is not at all foreshortened by the floor. Similarly, reflector 18 is larger in area than reflectors 20 and 22. As illustrated, reflectors 20 and 22 are approximately of equal size.

The invention has been described with particular reference to a preferred embodiment. It will be apparent to those skilled in the art that modificationns can be made without departing from the spirit and scope of the invention, as defined by the appended claims.

I claim:

1. A folded modular optical system for use in radiation detection devices for directing radiation from a plurality of fields of view onto a radiation-sensitive detector, said system comprising an elongated rectangularly-shaped spherical reflector, and a multifaceted reflective element having a plurality of planar reflectors, each of said planar reflectors being arranged to reflect radiation from a discretely different field of view onto a different portion of said spherical reflector, each of said portions having a dimension measured in a direction parallel to the longer dimension of said spherical reflector, which is only a fraction of said longer dimension.

2. The invention as defined in claim 1 wherein said spherical reflector is arranged with its optical axis in a vertical plane, wherein each planar reflector is arranged at a different tilt angle relative to the horizontal plane, such that the field of view of each planar reflector is directed below the horizontal at a different angle, and wherein the area of at least some of the planar reflectors is proportional to its tilt angle.

3. The invention as defined in claim 1 wherein said planar mirrors are canted relative to each other so that their respective fields of view are substantially co-planar.

4. A folded modular optical system comprising an elongated spherical reflector and a plurality of planar reflectors, each of said planar reflectors cooperating with a different portion of the spherical reflector to focus radiation emanating from a plurality of different fields of view, said portions having a dimension, measured in a direction parallel to the length of the spherical reflector, which is less than one-half said length.

5. The invention as defined in claim 4 wherein (a) said spherical reflector is arranged with its optical axis extending upwardly, (b) each planar reflector is arranged at a different tilt angle relative to the horizontal plane such that the field of view of each planar reflector is directed below the horizontal at a different angle, and (c) the area of at least some the planar reflectors is proportional to their respective tilt angle.

6. The invention as defined in claim 4 wherein said planar reflectors are canted relative to each other so that their respective fields of view are substantially co-planar.

* * * * *